Sept. 2, 1941.  E. BAUER  2,255,034
METHOD OF TESTING FLOUR AS TO COLOR AND ASH CONTENT
Filed Nov. 16, 1938
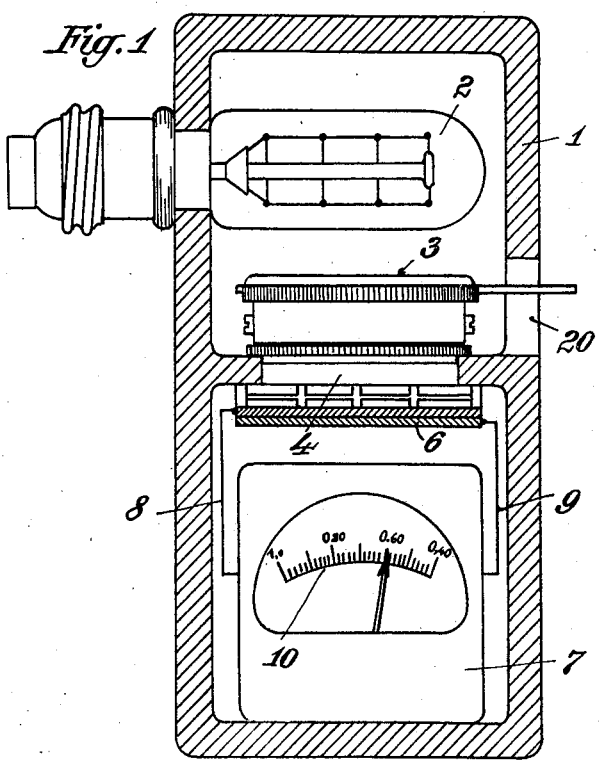
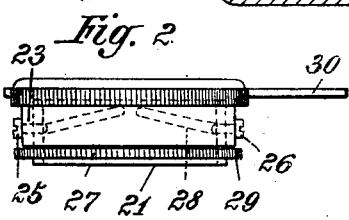
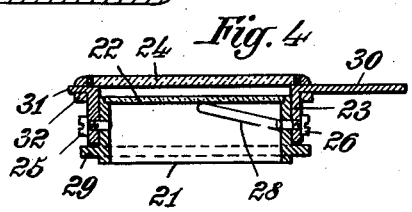
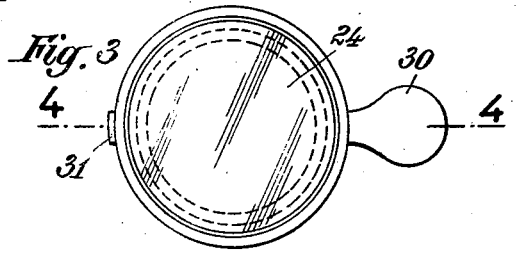
Inventor:
Edwin Bauer,
By Bailey
Attorneys Patented Sept. 2, 1941

2,255,034

UNITED STATES PATENT OFFICE 2,255,034

METHOD OF TESTING FLOUR AS TO COLOR AND ASH CONTENT

Edwin Bauer, Berlin, Germany

Application November 16, 1938, Serial No. 240,874
In Germany November 16, 1937

1 Claim. (Cl. 88—14)

The present invention relates to a method of determining to what degree a flour has been ground or of ascertaining the amount of scale present in the flour to be tested.

The scale content of a flour can be determined from the ash content of the same. When, for instance, a certain amount of flour is burnt at about 950° C. an ash is left, which contains the non-combustible constituents of the grain. These non-combustible constituents chiefly consist of minerals, of which by far the greater part originates from the scale, and only a very little part originates from the interior of the grain. Whilst the part of non-combustible minerals, i. e. the ash content, of the flour proper only amounts to about 0.35%, the scale tissue may contain up to 6 or 7% of non-combustible mineral constituents. If after a combustion the percentage of ash left is very high, this shows that the flour tested contains a great amount of constituents from the scale tissue and therefore is very rich in scale substance. If a flour is very dark, it contains a very high percentage of scale substance. The ash content can therefore also be determined by a color comparison. Light flours are poor in ashes and dark flours are rich in ashes. Therefore, flours which are poor in ashes originate from the interior of the grain and flours which are rich in ashes from the scale.

Of the methods of testing flour hitherto known the most exact consists in determining the ash content. By means of this test method the quality of a flour can be determined with absolute security. The method of determining the ash content consists therein that a certain amount of flour is filled into a small cup of porcelain, which thereupon is placed in a furnace of fire-proof brick-work, in the interior of which a temperature of 900–920° C. is maintained. In the course of 60–90 minutes the flour will burn to a white ash. After the ash for about an hour has been placed in a receptacle with a water-binding filling the ash is weighed. The weight shows the ash content of the tested flour.

Since the described method is very complicated, many attempts have been made to determine the ash content directly from the color of the flour. One of the methods proposed is the so-called Pekar water test, according to which the flour to be tested and the sample of flour used for comparison after a preliminary treatment are examined through the inspection opening of the test plate. Such a test comparison is however of little use, because the result of it is dependent upon a subjective impression.

Another attempt to replace the ash test by another test method was the following process: Of the flour to be tested a flour-water mixture was prepared and a layer of a definite height of this mass or pap was placed in an apparatus between a source of light and a light-sensitive cell, which was connected to a measuring instrument. When the source of light was switched on the light-sensitive cell was excited by the light rays penetrating the flour-water mixture. The intensity of the light acting upon the cell was hereby dependent upon the color of the mixture. The tests made according to this method were however not satisfactory. The reason for this unsatisfactory result was thought to be that the flour was in moist state when it was penetrated by the light rays.

According to the present invention the drawbacks described above are avoided. The essential features of the new method are that the light rays are sent through a layer of flour in dry state and that the intensity of the penetrating light rays is measured by means of a calibrated instrument. An amount of the flour to be tested of an accurately determined weight is in a dosing device compressed until a layer of a predetermined height is obtained. The height of the layer always remains the same. The volume of the dosing device can be altered, and it is therefore also possible to test flours, which have a high content of scale substances, and the height of the layer of which before the compression is greater than that of flours having a low content of scale substances.

The said dosing device consists of an inner annular sleeve with a glass cover and a second outer annular sleeve, which is equipped with a removable glass cover. By means of pins, which are fixed to the inner surface of the outer sleeve and are slidable in helical grooves in the inner sleeve, the latter can be moved telescopically within the former. The dosing and the forming of a layer of the desired height take place between the glass covers of the described sleeves.

The test of the flour in the dosing device by means of light rays is performed in a special apparatus, in which the light rays from a source of light and heat after the penetration of the compressed flour are projected against a photoelectric cell. Through the heat which thereby is developed the moisture is simultaneously driven out. The photo-electric cell is connected to a continuous current measuring instrument, the scale of which is so graduated and calibrated that the pointer in each case indicates the ash content or the shade of color of the flour which is tested. Since the pure flour has a constant ash content or content of minerals in the form of protoxide of potassium and phosphoric acid, the color is altered through the presence of fragments of scale, which together with the germs are the carriers of the mineral substances. Due to this, the more the corn is ground out the more the content of scale and germ substance and incidentally the ash content or shade of color will increase. The mineral constituents in the flour, the amount of which is dependent upon the degree to which the flour is ground out, will, when the light rays penetrate the layer of flour, which always has the same weight and the same height, offer a higher or lower resistance against the rays, whereby a correspondingly weaker or stronger current is generated in the photo-electric cell. This causes a deflection of the pointer of the measuring instrument, which on a calibrated scale indicates the ash content or shade of color in each single case.

An embodiment of a device for performing the method according to the invention is illustrated by way of example in the accompanying drawing in which Fig. 1 is a vertical section through a testing apparatus with inserted dosing device.

Fig. 2 is a lateral view of the dosing device.

Fig. 3 shows the dosing device in plan view.

Fig. 4 is a section through the dosing device on the line 4—4 in Fig. 3.

Fig. 5 shows the device by means of which the surface of the layer of flour is smoothed.

The testing apparatus consists of a box 1 of rectangular cross-section, in the upper part of which the lamp 2, which serves as a source of light and heat, is arranged in such a manner that the rays of light influencing the photo-electric cell 6 can pass through the compressed flour in the dosing device 3 and the window 4. If desired, a suitable lens or other ray condenser may be arranged between the lamp 2 and the cell 6. The cell 6 is, through wires 8 and 9, connected to a continuous current meter 7. In conformity with the strength of the current generated in the cell the pointer of the instrument is deflected and on the scale 10 indicates the ash content or the shade of color of the flour in each case.

Figs. 2, 3, and 4 show the device in which the flour is dosed and compressed until a layer of the desired height is obtained. In Fig. 2 23 denotes the outer sleeve on which a removable glass cover 24 is arranged. To the outer surface of this sleeve pins 25 and 26 are fixed, which are slidable in slots 27 and 28 in the inner sleeve 21.

Fig. 4 shows the inner sleeve 21 in its uppermost position. As it will be seen from the drawing the grooved ring or flange 29 of the inner sleeve 21 abuts against the lower edge of the outer sleeve 23 when sleeve 23 is in its lowermost position. By means of the handle 30 on the outer sleeve 23 the device may be held with one hand, whilst the inner sleeve 21 is turned with the other hand. On the bottom side of the rim surrounding the removable glass cover 24 projections 32 are provided, which, when the sleeve is turned, will engage the lower side of the handle 30 and a tongue 31 arranged diametrically opposite the same.

The apparatus acts in the following manner:

The inner sleeve 21 of the dosing device, which when the ring 29 is turned is raised and lowered telescopically, is brought into its lowermost position. Thereupon the glass cover 24 of the outer sleeve is removed, and the flour to be tested is filled in, preferably through a filter, whereupon the surface of the charge of flour is stroked level in a manner known per se, for instance by means of the smoothing device 16 shown in Fig. 5. After the excess of flour has been stroked off the filled dosing device is weighed. If it is found that the dosing device contains, for instance, more than 3 grammes of the flour to be tested, the inner sleeve 21 is, by means of the ring 29, turned somewhat to the right, whereby the volume of the hollow space of the dosing device between the glass covers is reduced. A small amount of flour is again removed by means of the smoothing device 16 and the dosing device is again weighed. If it is now found that the dosing device contains less than 3 grammes of flour, the inner sleeve is turned to the left, whereby the volume of the hollow space within the same is increased. An additional amount of flour is supplied and the surface of the charge of flour is again stroked level. This procedure is repeated until the desired weight of 3 grammes is obtained. The glass cover 24 is thereupon placed upon the outer sleeve 23 and turned until the projections 32 engage the handle 30 and the lug 31. Finally the inner sleeve 21 is turned to the right until the ring 29 abuts against the lower edge of the outer sleeve 23. In this way the layer of flour in the dosing device of the prescribed weight is always so compressed that the height of the layer of flour is kept constant. Now the dosing device with the flour to be tested is pushed into the apparatus through the opening 20 between the lamp 2 and the cell 6. After the lamp has been switched on the pointer of the measuring instrument will ascend until the moisture in the flour has been driven out. When the pointer finally stops at a value on the scale, which is only dependent upon the ash content of the flour, the result is read.

I claim:

The method of determining the ash content of flours, comprising the steps of compressing a predetermined quantity of flour containing moisture in a dosing device, supporting the compressed flour between a near source of light and heat and a photo-electric measuring device until the indicator of the device reaches a final position, measuring from the final position of the indicator of the photo-electric device the light transmitted through said flour, and comparing the measurement obtained with similar measurements of samples having the same weight, thickness and volume and containing known quantities of ash.

EDWIN BAUER.